Dec. 29, 1925.
W. H. DEAN
1,567,576
HARVESTING MACHINE
Filed Dec. 6, 1923
5 Sheets-Sheet 3
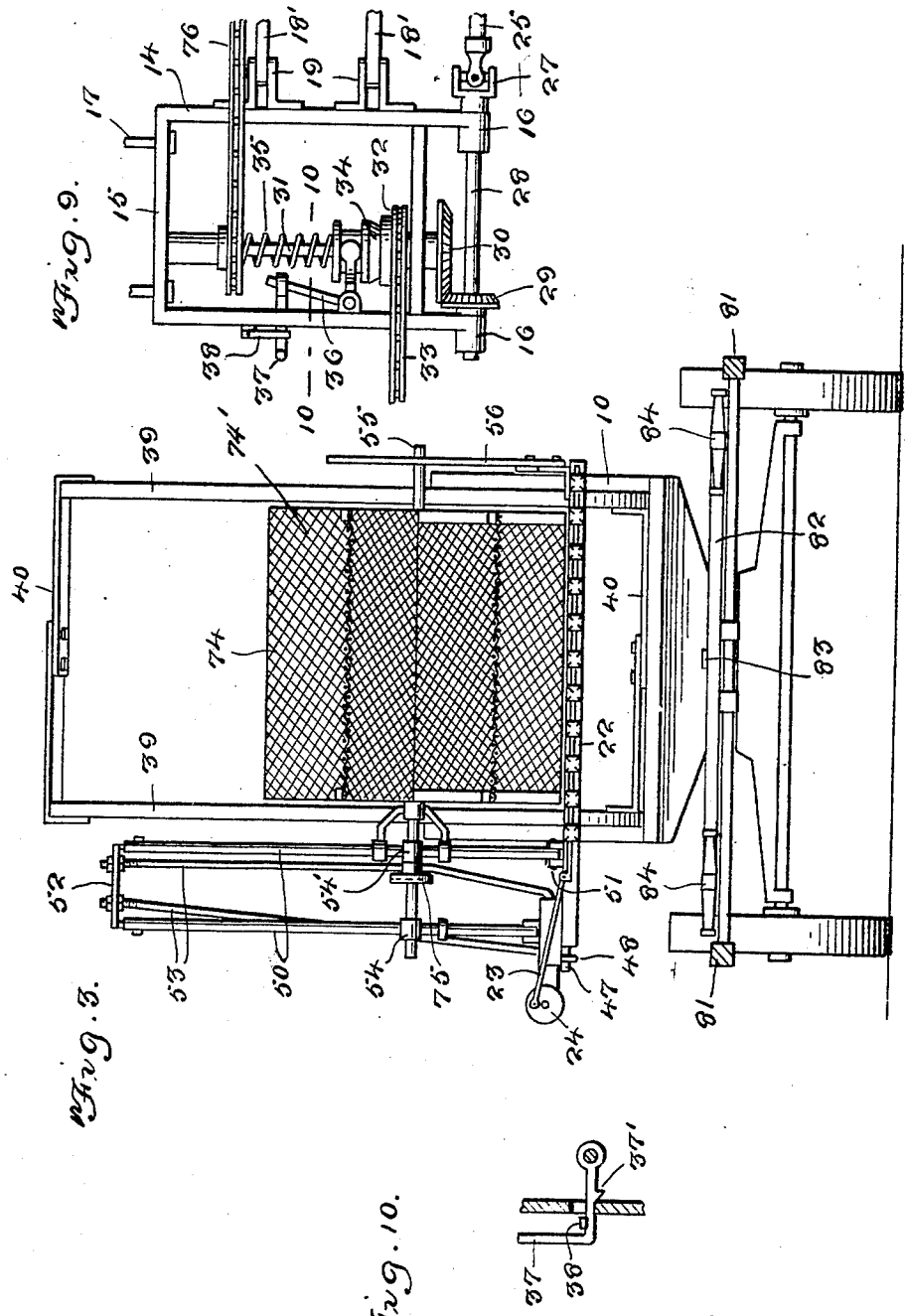

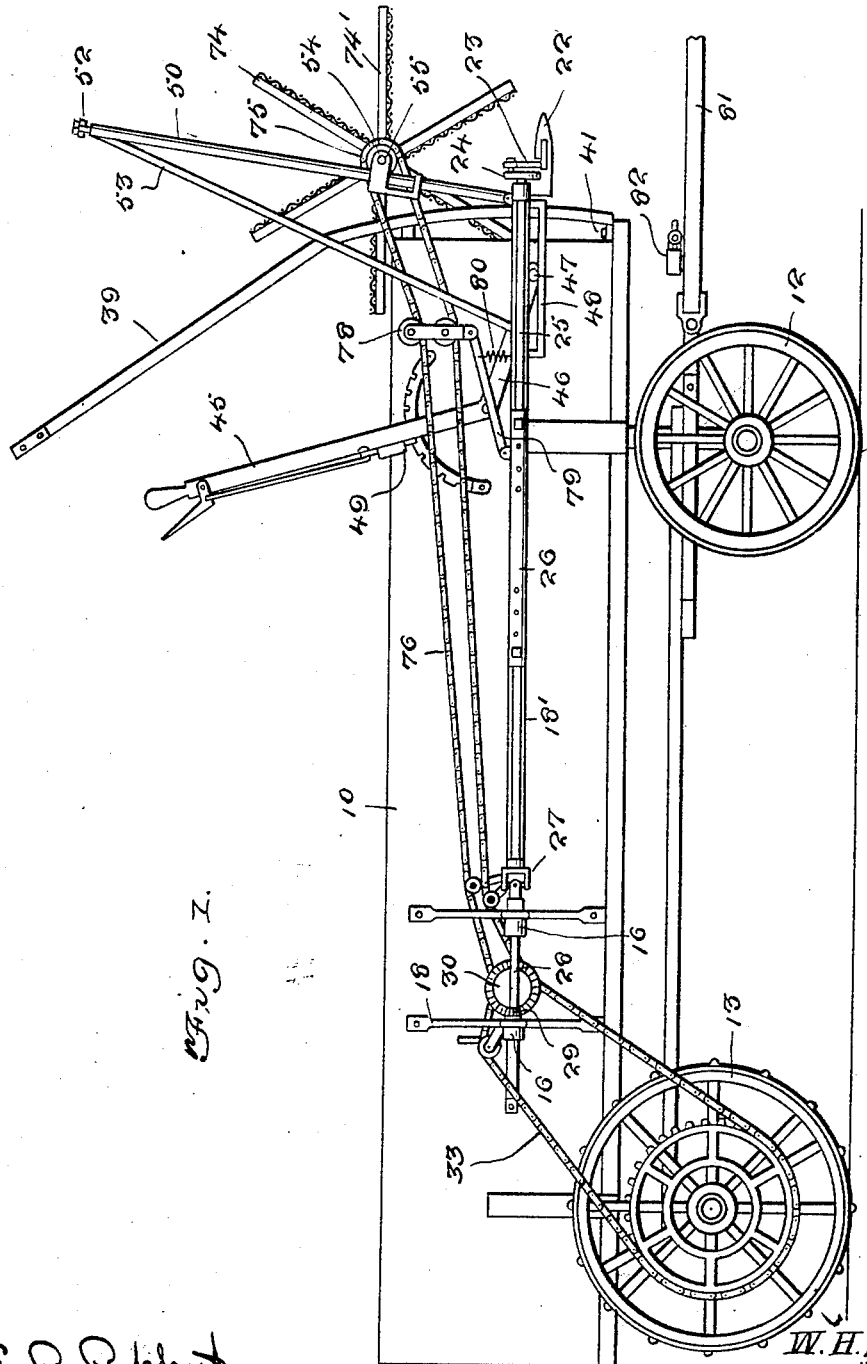

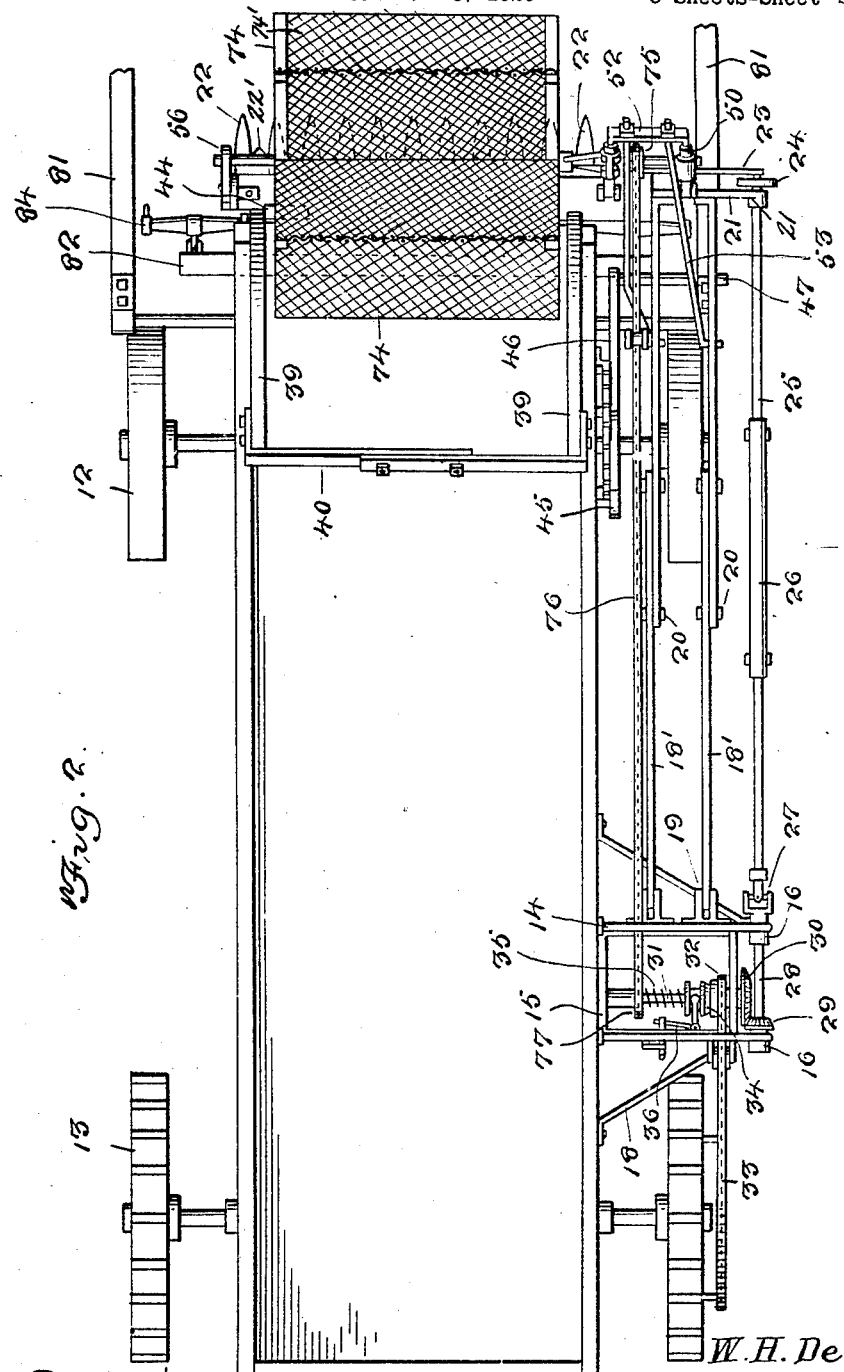

Dec. 29, 1925.
W. H. DEAN
1,567,576
HARVESTING MACHINE
Filed Dec. 6, 1923     5 Sheets-Sheet 4
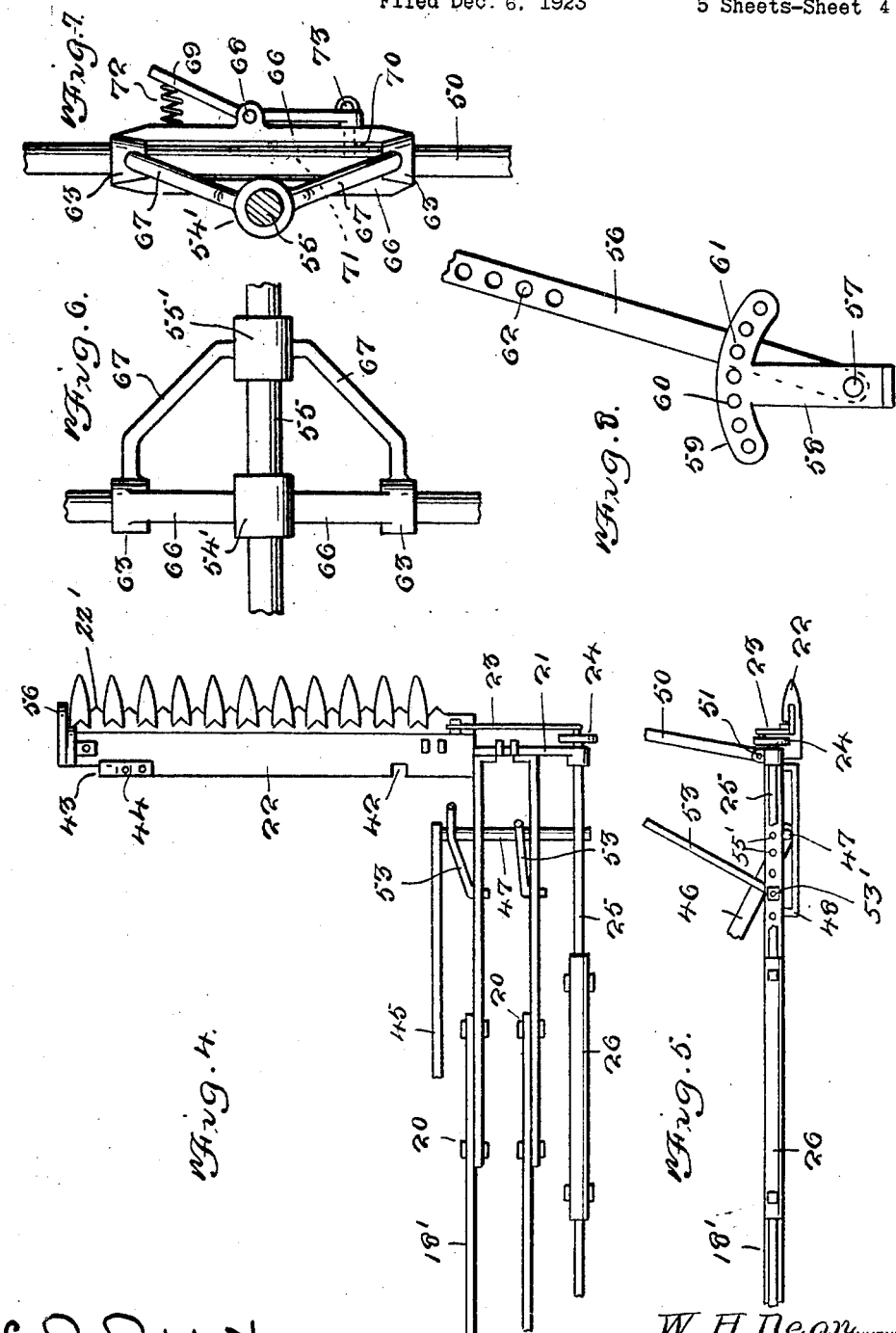

Dec. 29, 1925.
W. H. DEAN
HARVESTING MACHINE
Filed Dec. 6, 1923
1,567,576
5 Sheets-Sheet 5
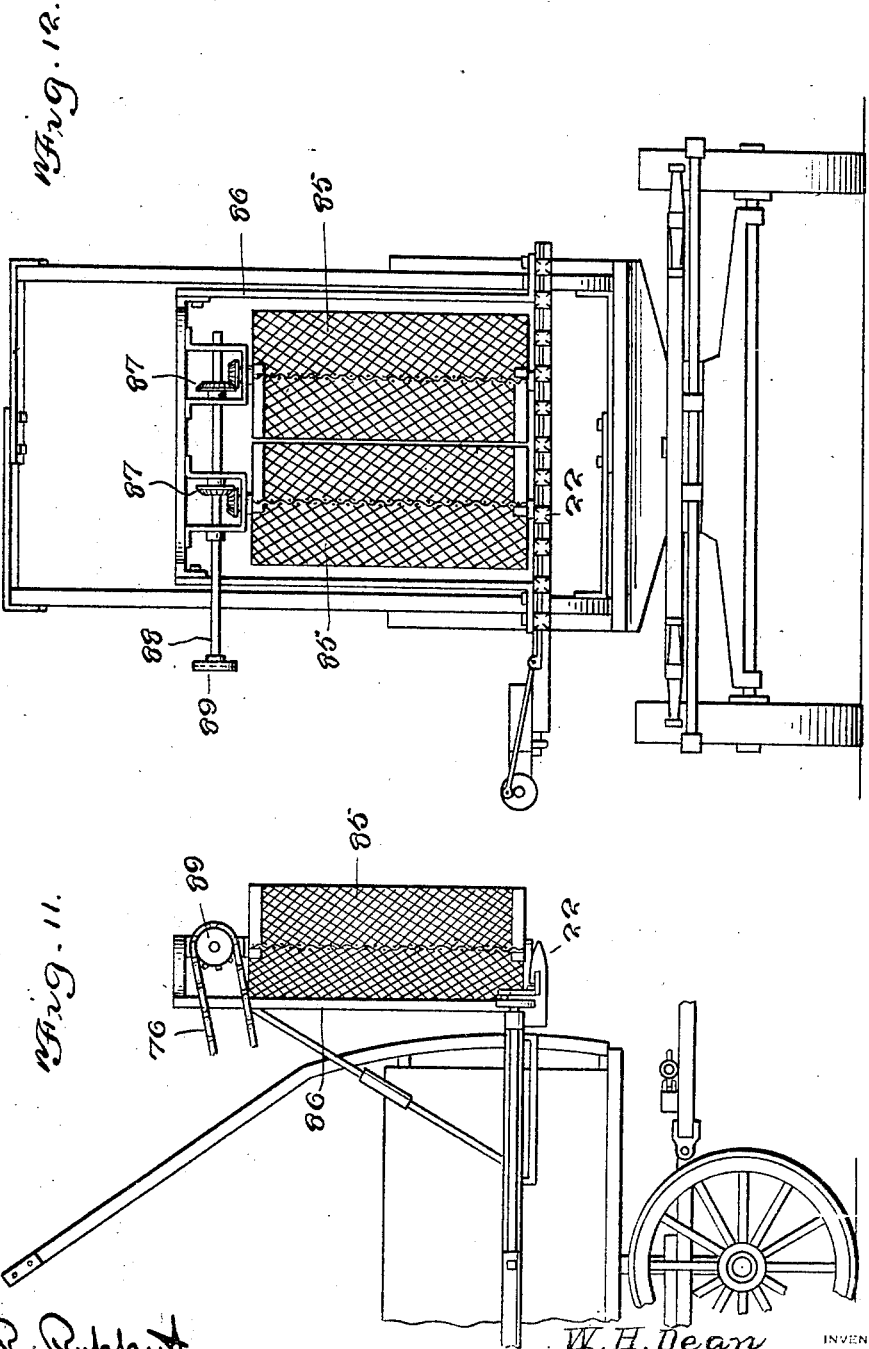

Patented Dec. 29, 1925.

1,567,576

UNITED STATES PATENT OFFICE.

WESLEY H. DEAN, OF ROGER MILLS COUNTY, OKLAHOMA.

HARVESTING MACHINE.

Application filed December 6, 1923. Serial No. 678,906.

*To all whom it may concern:*

Be it known that I, WESLEY H. DEAN, a citizen of the United States, residing in Roger Mills County, State of Oklahoma, have invented new and useful Improvements in Harvesting Machines, of which the following is a specification.

This invention relates to grain heading machines and has for an object the provision of a heading mechanism which may be attached to the ordinary farm wagon or the like so that the latter may be used for heading sorghum crops of any character.

Another object of the invention is the provision of a header mechanism which is adjustable to wagons of different sizes, so that an ordinary wagon may be used to supply power for the operation of the mechanism, to support said mechanism and to receive the headed grain.

Another object of the invention is the provision of a grain header having a throat of sufficient width to engage the grain irrespective of the character of the land.

Another object of the invention is the provision of means of the above character which are simple in construction, reliable in operation and which may be conveniently attached to a wagon and adjusted to the height of the grain.

With the above and other objects in view, the invention further includes the following novel features and details of construction, to be hereinafter more fully described, illustrated in the accompanying drawings and pointed out in the appended claims.

In the drawings:—

Figure 1 is a side elevation of a wagon with the invention applied thereto.

Figure 2 is a top plan view of the same.

Figure 3 is a front elevation.

Figure 4 is a fragmentary top plan view showing the cutter bar and a portion of its supporting frame and operating means.

Figure 5 is an edge view of Figure 4.

Figure 6 is an enlarged detail elevation of one of the adjustable bearings for the beater shaft.

Figure 7 is a view at right angles to Figure 6.

Figure 8 is a detail elevation of the other fan shaft bearing.

Figure 9 is a fragmentary top plan view showing a portion of the driving mechanism for the cutter bar and fan.

Figure 10 is a fragmentary sectional view taken substantially on the line 10—10 of Figure 9.

Figures 11 and 12 are fragmentary side and front views respectively showing a modified form of the invention.

Referring to the drawings in detail wherein like characters of reference denote corresponding parts, the reference character 10 indicates the body of a wagon, such as an ordinary farm wagon which is supported upon front wheels 12 and rear wheels 13, one of the latter having substituted therefor or being converted into a tractor wheel which is adapted to supply power for the operation of the header mechanism, as will be hereinafter apparent.

This header mechanism is adapted to be removably secured to the body 10 of the wagon and for this purpose comprises a bracket which includes spaced parallel arms 14 which are connected by transverse bars 15, so that a rectangular frame is provided from one end of which extend bearings 16. The frame is secured to the wagon body as by bolts 17 and vertical and horizontal braces 18, whereby the said frame will be rigidly held in position.

The invention further includes spaced parallel bars 18' which are pivotally secured to one of the arms 14 as shown at 19 and which extend longitudinally of the wagon body 10. These bars 18' are adjustable as shown at 20 to regulate their lengths and are connected at their outer ends by a laterally extending arm 21 and serve to support a sickle 22.

The sickle 22 is of any ordinary construction including reciprocatory blades or cutters 22' which are operated by a pitman 23 connected to an eccentric 24, the latter being secured to a shaft 25 which has one of its ends mounted in a bearing 21' carried by the arm 21. The shaft 25 is also adjustable as to its length as shown at 26 and extends parallel with the bars 18', its inner end being connected by a universal joint 27 with a shaft 28. This last mentioned shaft is mounted in the bearings 16 of the rectangular frame and has secured thereon a pinion 29 which is engaged and driven by a gear 30. This gear is fast upon a shaft 31 mounted in bearings in the rectangular frame, while loosely mounted upon this shaft is a sprocket 32. The sprocket is driven by a chain 33 which is in turn driven from the tractor wheel 13 and may be locked so as to rotate with the shaft 31 by means of a clutch 34. The clutch is yieldingly forced into engaged position to lock the sprocket to the shaft by means of a spring 35 and is released through the medium of a bell crank lever 36 which is controlled by an operating lever 37. This last mentioned lever is movable transversely through the rectangular frame as illustrated in Figures 9 and 10 of the drawings and carries a tooth 37' for engagement with said frame, the tooth being yieldingly held in position by means of a spring 38.

The sickle 22 is capable of vertical adjustment and extends across the front open end of the body 10 and in order to steady the sickle and guide the latter during adjustment there is provided a frame which includes upwardly and rearwardly extending spaced bars 39. These bars are connected at their upper and lower ends by transverse bars 40, so that a rectangular frame is provided. This frame has its lower end secured to the body 10 as shown at 41 and the sickle is provided with notches 42 and 43, which receive the bars 39, the last mentioned notch having one of its walls adjustable so as to regulate it with respect to the distance between the bars 39. This adjustment is effected by means of an adjusting plate 44 which is secured to the sickle.

The sickle is raised and lowered by means of a hand lever 45 which is pivoted upon the body 10 and which carries an angular extension or arm 46 from which extends a laterally disposed bar 47. This bar extends through guide loops 48 carried by the bars 18 and the shaft 25 so that by rocking the hand lever 45 upon its pivot, the sickle may be raised and lowered. The hand lever 45 is provided with a spring latch 49 so as to hold the sickle in adjusted position.

Extending upwardly from the sickle is a frame which includes spaced parallel bars 50, the lower ends of these bars being pivotally secured to the sickle as shown at 51, while their upper ends are connected by a bar 52. Extending from this last mentioned bar are brace rods 53 whose lower ends are adjustably secured to the bars 18' by bolts 53' engaging in the openings 55' so that the bars of the frame 50 may be swung forward or rearward. The bars 50 serve to support bearings 54 and 54' which are movable vertically on said bars and which serve to support one end of a shaft 55. The opposite end of this shaft is mounted in a bearing arm 56 whose lower end is pivoted as at 57 to an arm 58, the latter carrying a segment 59 having spaced openings 60 therein. These openings are adapted to receive a bolt or pin 61 which passes through the bearing arm 56 so that the said arm may be adjusted pivotally. The bearing arm 56 is provided with spaced openings 62 for the reception of the shaft 55 so that the latter may be adjusted with respect to the bearing arm.

The bearing 54 which is shown in side elevation in Figure 1 of the drawings is slidable upon one of the bars 50, while the bearing 54' which is shown in detail in Figures 6 and 7 of the drawings is also slidable upon the other bar 50. This bearing 54' comprises spaced sleeves 63 which receive the bar 50 and are connected by arms 66, while also extending from the sleeves 55 are inclined arms 67 which support the bearing 54'. One of the arms 66 has pivotally mounted thereon as shown at 68 a latch bar 69, one end of which carries a latch pin 70 for engagement with any one of a plurality of sockets 71 provided in the bar 50. The latch pin is yieldingly forced into these sockets by means of a spring 72, while an eye 73 is carried by the latch whereby the pin may be conveniently disengaged.

The shaft 55 carries a beater 74 which includes radially extending beater blades 74' of foraminous material, the latter being located immediately above the sickle 22 so that the headed grain will be forced into the forward open end of the body 10. By means of the hand lever 45, the sickle bar and beater may be simultaneously and vertically adjusted as previously described, while the beater may be adjusted forward and rearward through the adjustment of the bearing arm 56 and the spaced arms 50, while further adjustment may be obtained by adjusting the beater shaft vertically.

The beater shaft 55 has secured thereon a sprocket 75 which is driven by a chain 76, the latter being in turn driven by a sprocket 77 secured upon the shaft 31. A belt tightener 78 engages the chain 76 and is pivotally mounted upon the outer end of a pivotally mounted arm 79, the latter being yieldingly forced in one direction by means of a spring 80. The belt 76 may thus be maintained in proper operative condition irrespective of the adjustment of the beater shaft.

In the use of the invention in connection with a wagon of this character it is preferred to remove the usual draft tongue and to substitute therefor tongues 81 which are spaced sufficiently apart to receive between them a pair of draft animals with sufficient space between the animals. A double tree 82 is pivotally secured to the wagon by means of a pin or bolt 83 and the double tree 82 carries single trees 84 to provide means for attaching the draft animals.

In Figures 11 and 12 of the drawings there is illustrated a modified form of the invention. In this form, instead of employing a single horizontal rotatable beater, a pair of vertically disposed beaters 85 are employed. These beaters are mounted upon spaced vertically disposed shafts which are supported in a frame 86 carried by the sickle and which are driven by means of gears 87 and a shaft 88, the latter having mounted thereon a sprocket 89 which is driven by the chain 76 as in the previously described form of the invention.

The invention is susceptible of various changes in its form, proportions and minor details of construction and the right is herein reserved to make such changes as properly fall within the scope of the appended claims.

Having described the invention what is claimed is:—

1. In combination, a body, a pair of rods pivoted to the body, guide loops on the rods, a crank rockably mounted on the body and having an extension in the loop, a sickle on the rods, a frame pivoted to the sickle, bearings slidable on the frame, a beater journaled in the bearings, means for holding the bearings in different adjusted positions, a brace pivoted to the frame, and adjustable connecting means between the brace and the rods.

2. In combination, a body, a pair of rods pivoted to the body, guide loops on the rod, a crank rockably mounted on the body and having an extension in the loops, a sickle on the rod, a pair of bars pivoted to the sickle, bearings slidable on the bars, a third bar pivoted to the sickle, means associated with the third bar for holding it in different adjusted angular positions in relation to the body and sickle, and said last mentioned bar provided with a plurality of spaced openings, bearings slidably mounted on the first mentioned pair of bars, means for holding the bearings in different adjusted positions, and a beater journaled in the bearings and in the openings of the third bar.

3. In combination, a body, a pair of rods pivoted to the body, guide loops on the rod, a crank rockably mounted on the body and having an extension in the loops, a sickle on the rod, a pair of bars pivoted to the sickle, bearings slidable on the bars, a third bar pivoted to the sickle, means associated with the third bar for holding it in different adjusted angular positions in relation to the body and sickle, said last mentioned bar provided with a plurality of spaced openings, bearings slidably mounted on the first mentioned pair of bars, means for holding the bearings in different adjusted positions, a beater journaled in the bearings and in the openings of the third bar, and a pair of braces pivotally attached to the first pair of bars, and adjustable connecting means between the braces and the rod.

4. In combination, a body, a pair of rods pivoted to the body, means for swinging the rods to different angular positions in relation to the body, a sickle on the rod, a frame pivoted to the sickle, bearings slidable on the frame, a beater journaled in the bearings, means for holding the bearings in different adjusted positions on the frame, a brace pivoted to the frame, and adjustable connecting means between the brace and the rods.

In testimony whereof I affix my signature.

WESLEY H. DEAN.